United States Patent
Boeck

(10) Patent No.: US 10,151,209 B2
(45) Date of Patent: Dec. 11, 2018

(54) SEALING SYSTEM MADE OF CERAMIC FIBER COMPOSITE MATERIALS

(71) Applicant: MTU Aero Engines AG, Munich (DE)

(72) Inventor: Alexander Boeck, Kottgeisering (DE)

(73) Assignee: MTU Aero Engines AG, Munich (DE)

(*) Notice: Subject to any disclaimer, the term of this patent is extended or adjusted under 35 U.S.C. 154(b) by 2 days.

(21) Appl. No.: 15/433,385

(22) Filed: Feb. 15, 2017

(65) Prior Publication Data
US 2017/0241282 A1 Aug. 24, 2017

(30) Foreign Application Priority Data

Feb. 22, 2016 (EP) ..................................... 16156681

(51) Int. Cl.
F01D 11/00 (2006.01)
F16J 15/10 (2006.01)
(Continued)

(52) U.S. Cl.
CPC .......... *F01D 11/003* (2013.01); *F01D 11/005* (2013.01); *F01D 25/24* (2013.01); *F16J 15/062* (2013.01); *F16J 15/0812* (2013.01); *F16J 15/102* (2013.01); *F16J 15/104* (2013.01); *F01D 25/28* (2013.01); *F02C 7/20* (2013.01); *F05D 2220/323* (2013.01);
(Continued)

(58) Field of Classification Search
CPC ....... F01D 11/003; F01D 25/24; F16J 15/102; F16J 15/104; F05D 2220/323; F05D 2240/60; F05D 2300/10; F05D 2300/6033
See application file for complete search history.

(56) References Cited

U.S. PATENT DOCUMENTS

| 2,420,104 A | * | 5/1947 | Smith | F16J 15/166 277/453 |
| 5,082,293 A | * | 1/1992 | Steinetz | F02K 1/805 239/265.11 |

(Continued)

FOREIGN PATENT DOCUMENTS

| EP | 1239119 | 9/2002 |
| EP | 1795705 | 6/2007 |

(Continued)

*Primary Examiner* — Gilbert Y Lee
(74) *Attorney, Agent, or Firm* — Davidson, Davidson & Kappel, LLC

(57) ABSTRACT

A sealing system including a first component at least partially manufactured from ceramic fiber composite materials, a second component at least partially manufactured from ceramic fiber composite materials, and a sealing element accommodated between the first component and the second component. The sealing element is designed as a sealing strip. It is provided that at least one recess accommodating the sealing element is formed on the first component and/or on the second component, the recess having a cross-sectional profile including an inner section which is concave toward the sealing element, the radius of curvature of the inner section being selected in such a way that it may be formed with the aid of continuous, curved fibers of the ceramic fiber composite material, the fibers being oriented in such a way that they lie essentially in parallel to the cross-sectional plane of the cross-sectional profile.

14 Claims, 4 Drawing Sheets

(51) Int. Cl.
  *F01D 25/24* (2006.01)
  *F16J 15/06* (2006.01)
  *F16J 15/08* (2006.01)
  F01D 25/28 (2006.01)
  F02C 7/20 (2006.01)

(52) U.S. Cl.
  CPC ...... *F05D 2240/60* (2013.01); *F05D 2300/10* (2013.01); *F05D 2300/6033* (2013.01); *F05D 2300/6034* (2013.01); *Y02T 50/672* (2013.01)

(56) References Cited

U.S. PATENT DOCUMENTS

| | | |
|---|---|---|
| 5,630,700 A | 5/1997 | Olsen et al. |
| 2003/0133792 A1 | 7/2003 | Vedantam et al. |
| 2014/0144157 A1 | 5/2014 | Cairo et al. |
| 2015/0016971 A1 | 1/2015 | Freeman et al. |
| 2015/0321382 A1* | 11/2015 | Jarmon ............ F01D 5/00 60/796 |
| 2016/0201910 A1* | 7/2016 | Chang ............ F01D 11/08 60/753 |
| 2016/0265389 A1* | 9/2016 | Jarmon ............ F01D 5/00 |

FOREIGN PATENT DOCUMENTS

| | | |
|---|---|---|
| EP | 2412929 | 2/2012 |
| EP | 2784272 | 10/2014 |
| GB | 2271396 | 4/1994 |
| WO | WO2015/157751 | 10/2015 |

* cited by examiner

SEALING SYSTEM MADE OF CERAMIC FIBER COMPOSITE MATERIALS

This claims the benefit of European Patent Application EP 16156681.5, filed Feb. 22, 2016 and hereby incorporated by reference herein.

The studies which have led to this invention were supported by the Grant Agreement No. CSJU-GAM-SAGE-2008-001 as part of the Seventh Framework Program of the European Union (FP7/2007-2013) for the Clean Sky Joint Technology Initiative.

BACKGROUND

The present invention relates to a sealing system including a first component which is at least partially manufactured from ceramic fiber composite materials, a second component which is at least partially manufactured from ceramic fiber composite materials, and a sealing element which is accommodated between the first component and the second component, the sealing element being designed as a sealing strip, in particular as a braided hose made of metallic and/or ceramic materials.

In order to increase efficiencies or to reduce the weight, attempts are made in different sectors of mechanical engineering to replace metallic components by ceramic fiber composite materials (CMC). Due to the lower usable strength of these materials and the more complex methods utilized for their manufacture, larger metal structures, in particular, must therefore be broken down into small units. Additional sealing points therefore result between the smaller units, which must be sufficiently sealed for a corresponding device or machine in order to avoid, for example, leakages or the like.

SUMMARY OF THE INVENTION

It is an object of the present invention to provide an approach for the additional sealing points.

In order to achieve this object, it is provided that, in a sealing system, at least one recess accommodating the sealing element is formed on the first component and/or on the second component, the recess having a cross-sectional profile including an inner section which is concave toward the sealing element, the radius of curvature of the inner section being selected in such a way that it may be formed with the aid of continuous, curved fibers of the ceramic fiber composite material. The fibers may be advantageously oriented, in this case, in such a way that they lie essentially in parallel to the cross-sectional plane of the cross-sectional profile.

Due to the design of the recess with the aid of continuous, curved fibers, a high strength of the recess may be achieved. Due to the suitable selection of the dimensions of the radius of curvature, the presence of cut fibers may be avoided. The term "continuous" is intended to mean, in particular, that the curved or bent fibers are designed to be continuous or whole in the curved area of the recess.

It is preferred that the sealing strip includes a braided hose having an elastic and/or deformable filling, the filling preferably being formed from ceramic fibers extending in the longitudinal direction of the sealing strip.

Such a sealing strip may be designed, in terms of its dimensions, in such a way that it is appropriate for the radius of curvature of the inner section of the recess. Due to appropriate dimensioning, such a sealing strip may bridge relatively large gaps at the sealing point between the first component and the second component, so that a sufficient seal of the two components is made possible. Due to the elastic and/or deformable filling, the sealing strip may fit optimally into the recess, so that a good sealing effect may be achieved.

It is provided that an adjoining flange section is formed in the area of the recess of the particular first or second component, on at least one edge of the recess. If such a recess is viewed in a position in which the recess is oriented essentially horizontally, so that the sealing strip would remain in the recess due to the force of gravity, a relevant flange section may additionally extend in the vertical direction or in the horizontal direction along the edge. In other words, the flange section may be designed, with respect to a cross section of the recess, as a, in particular, parallel extension of the edge or as a, in particular, orthogonal extension of the edge.

In this case, it is preferred that the first and the second components are supported against one another with the aid of one flange section or with the aid of multiple flange sections. Furthermore, an expansion gap may be formed between the first component and the second component, which are situated next to one another. Providing at least one flange section on the two components makes it possible for the components to be supported against one another, in particular in the event of thermal expansion or an associated mechanical displacement of the components. In this case, the expansion gaps may be greatly constricted during operation, due to the thermal-mechanical displacements, so that adjacent components come into direct contact with one another, in particular via corresponding flange sections.

The recess in the first component and the recess in the second component may be preferably situated opposite one another in such a way that the sealing strip is surrounded by the two recesses and is accommodated between the two recesses. A type of circular or oval receptacle, in which the sealing strip is accommodated, may therefore be formed by the two recesses in the first component and the second component. In this case, each of the recesses may form a type of half shell.

The present invention further also relates to a turbine intermediate casing for a gas turbine, in particular an aircraft gas turbine, including: multiple outer wall elements situated in succession in the circumferential direction; multiple inner wall elements situated in succession in the circumferential direction, the outer wall elements and the inner wall elements delimiting a flow channel 20 for exhaust gas by the inner sides facing one another; multiple strut lining elements situated in the radial direction between a respective outer wall element and a respective inner wall element, an outer casing surrounding the outer wall elements and the inner wall elements, and an annular holding structure which surrounds a bearing area of a shaft of the gas turbine, in particular the shaft of the high-pressure turbine, the strut lining elements being designed in such a way that they have an accommodating space for accommodating support elements which extend from the annular holding structure in the essentially radial direction to the outer casing, through the flow channel, so that exhaust gas flowing through the flow channel is directed around the support elements by the strut lining elements, the turbine intermediate casing further including at least one above-described sealing system, and one particular outer wall element and/or one particular inner wall element and/or one particular strut lining element forming a first or a second component of the at least one sealing system.

The present invention further also relates to a gas turbine, in particular an aircraft gas turbine, including such a turbine intermediate casing including a sealing system according to the present invention.

Turbine intermediate casings of gas turbines, in particular aircraft gas turbines, are used, in particular, for directing the exhaust gases which exit the high-pressure turbine past structural components and lines, with preferably low aerodynamic losses, into the low-pressure turbine. Furthermore, the turbine intermediate casing accommodates at least one bearing of the shaft of the high-pressure turbine, as the supporting structure. A turbine intermediate casing is therefore exposed to high loads, in particular mechanical and thermal loads, during the operation of the gas turbine.

In terms of the mechanical strains, factors, in particular, such as the weight of the utilized components and their structural connections among one another, must be taken into consideration. In conventional lining elements manufactured, in particular, from metallic materials, it is common, for example, to connect the outer wall elements and the inner wall elements to one another with the aid of the strut lining elements in such a way that this entire structure is fastened and supported on the outer casing, the inner wall elements being fastened on the strut lining elements which, in turn, are connected to the outer wall elements. This results in the transfer of mechanical and, in addition, thermal loads from the aforementioned components onto the outer casing.

Due to the use of ceramic fiber composite materials, which are referred to in the following simply as CMC, in a turbine intermediate casing, weight may be reduced as compared to metallic components. It should be noted in this case, however, that CMC components, due to their unfavorable failure characteristics, have a lower usable strength as compared to metallic components, so that, in particular, larger (planar) metal components must be divided into smaller CMC units. Due to the coupling to different components (outer casing or holding structure) selected in conjunction with the use of CMC outer wall elements and inner wall elements, the outer wall elements and the inner wall elements are supported against different structural components of the turbine intermediate casing. This reduces or prevents the transfer of loads from adjacent components of the turbine intermediate casing and the gas turbine via the outer wall elements and the inner wall elements manufactured from CMC.

Further aspects related to the design of a turbine intermediate casing are found in the patent application entitled "Turbine Intermediate Casing and Sealing System Made of Ceramic Fiber Composite Materials" which has been simultaneously filed by the applicant. The features described therein for the design of the turbine intermediate casing are incorporated into the present application by reference.

BRIEF DESCRIPTION OF THE DRAWINGS

The present invention is described in the following with reference to the attached figures, by way of example and in a non-restrictive manner, in particular on the basis of a turbine intermediate casing including at least one sealing system according to the present invention, in which in one embodiment.

DETAILED DESCRIPTION

Figure 1:
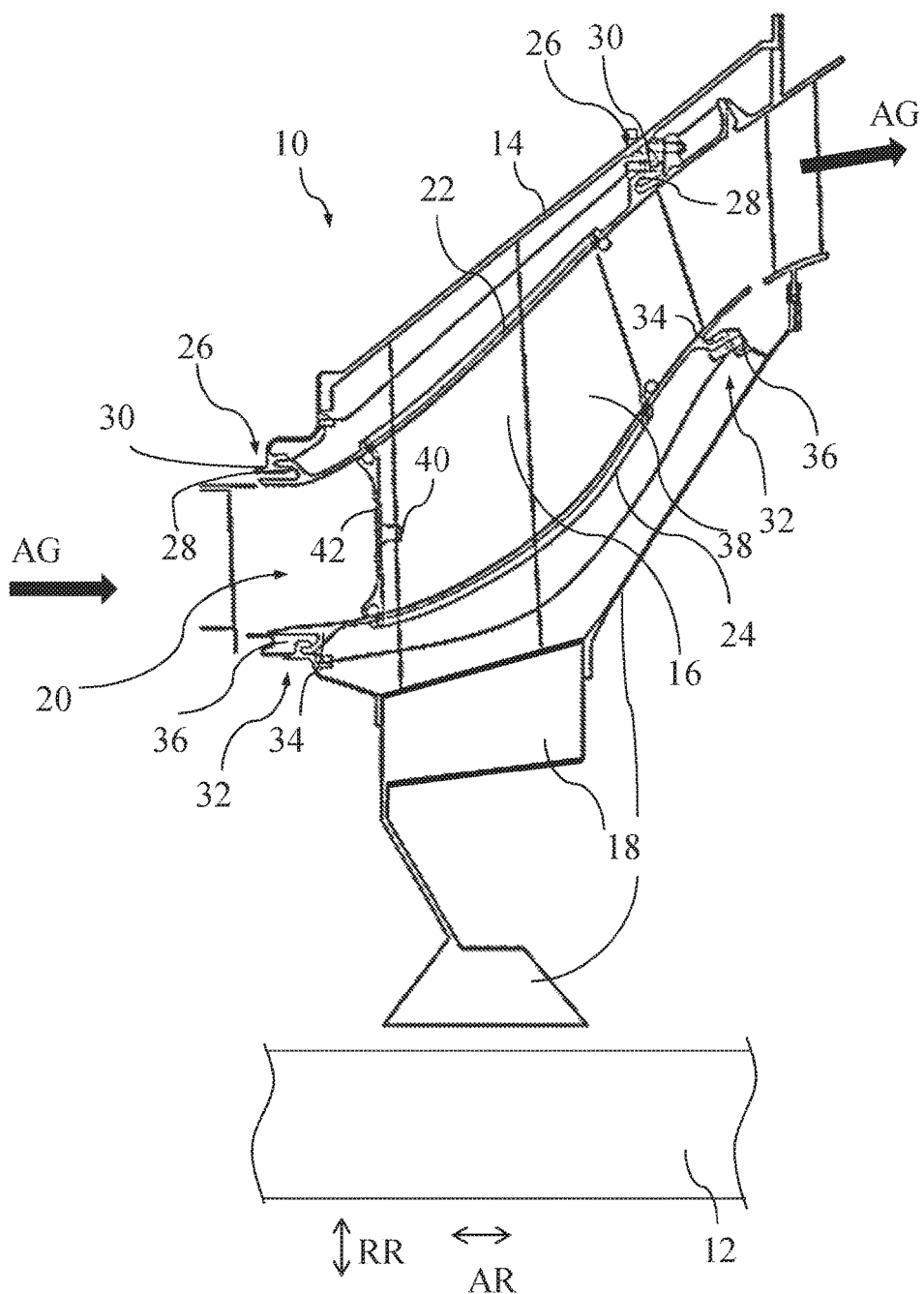
FIG. 1 shows a schematic sectional representation of a turbine intermediate casing.

FIG. 1 shows a simplified, schematic sectional representation of a turbine intermediate casing 10 which is also referred to in the following as TCF (turbine center frame). TCF 10 is situated around a shaft 12 of a gas turbine, in particular an aircraft gas turbine or a turbofan engine, which is merely schematically indicated in FIG. 1. The longitudinal extension of shaft system 12 is referred to in the following as axial direction AR. The direction orthogonal thereto is referred to in the following as radial direction RR.

Turbine intermediate casing 10 includes a radially exterior outer casing 14. This outer casing 14, which is made of metal, is connected to a radially interior annular holding structure 18 with the aid of support elements 16. A flow channel 20 is provided between outer casing 14 and holding structure 18, through which hot exhaust gases may flow, in particular from the high-pressure turbine to the low-pressure turbine, as indicated by the two arrows AG. Flow channel 20 is delimited by multiple outer wall elements 22 which are adjacent to one another in the circumferential direction and lie radially exterior, and by multiple inner wall elements 24 which are adjacent to one another in the circumferential direction and lie radially interior.

Outer wall elements 22 are connected to outer casing 14 with the aid of suitable connection systems 26. In the present example, outer wall elements 22 include hook-like projections 28 at their two axial ends, which are engaged in corresponding counterparts 30 of outer casing 14.

Inner wall elements 24 are connected to annular holding structure 18 with the aid of suitable connection systems 32. Inner wall elements 24 include hook-like projections 34 at their axial ends, which are accommodated in corresponding counterparts 36 of holding structure 18.

As is apparent from FIG. 1, support elements 16, which may also be referred to as support struts or struts, extend in the essentially radial direction through flow channel 20 and through a particular inner wall element 24 and outer wall element 22. In order to guide exhaust gas flow AG around support elements 16 in flow channel 20, strut lining elements 38 are provided between particular outer wall elements 22 and inner wall elements 24, which surround or line support elements 16 in the area of flow channel 20 and, in this case, preferably have an aerodynamically optimized flow profile. Strut lining elements 38 are accommodated, in this case, in particular openings in outer wall elements 22 and inner wall elements 24, the strut lining elements being floatingly supported between particular outer wall elements 22 and particular inner wall elements 24. Furthermore, strut lining elements 38 include a projection 40 on their axial front end relative to the flow direction of exhaust gas AG, which extends, in particular, in axial direction AR, into the accommodating space for support element 16 and rests against support element 16. This axial stop 40 secures the relative position of strut lining element 38 with respect to support element 16 during operation when compressive forces resulting from hot exhaust gas AG act upon an axial front side 42 of strut lining element 38.

Figure 2:
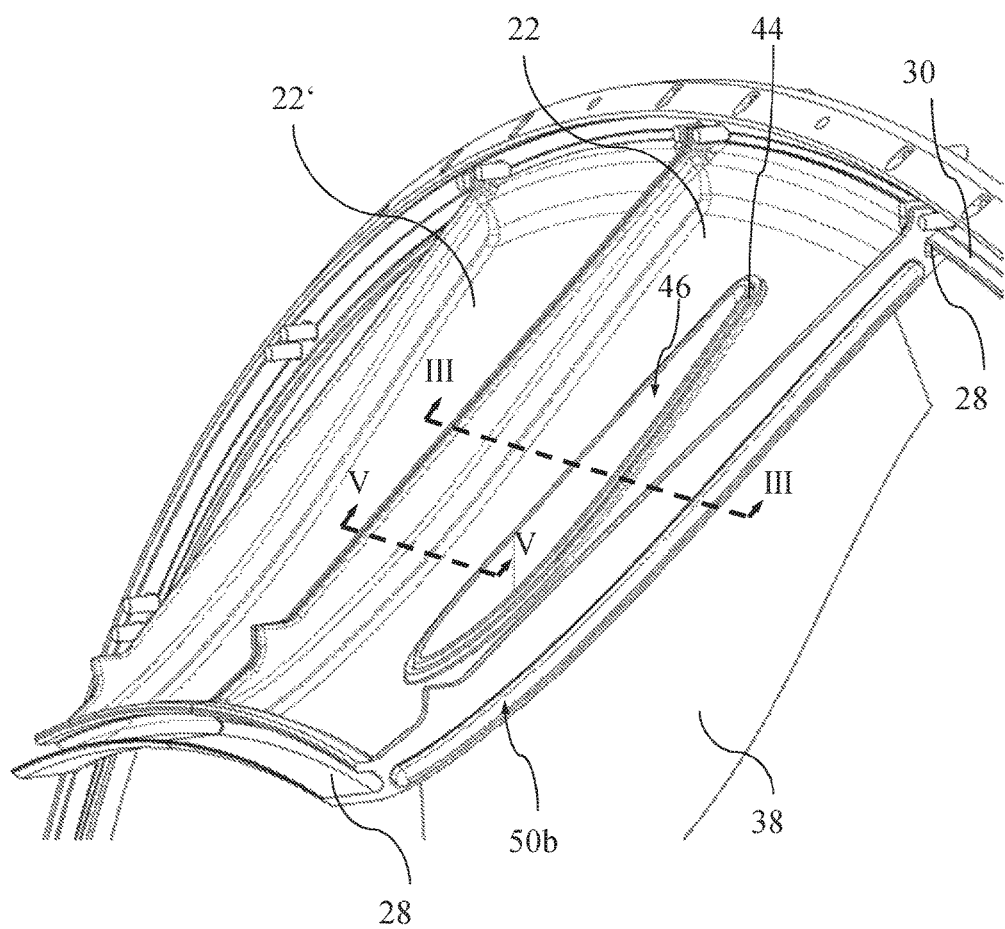
FIG. 2 shows a schematic perspective partial representation of an outer wall element and a strut lining element inserted into an opening of the outer wall element.

FIG. 2 shows a schematic perspective partial representation of an outer wall element 22 and a strut lining element 38 inserted into an opening 44 of outer wall element 22. This representation of FIG. 2 also shows accommodating space 46 which is formed by strut lining element 38 and through which support element 16 may extend (FIG. 1). As already indicated with reference to FIG. 1, outer wall element 22 includes hook-like fastening section 28 in its axially front area (relative to the flow direction of the exhaust gas), with no corresponding counterpart 30 of outer casing 14 (FIG. 1) being represented in FIG. 2. The axially rear end of outer wall element 22 includes one further hook-like fastening element 28 which is connected to a corresponding counterpart 30 of the outer casing.

The statements presented here, by way of example, for an outer wall element 22 also apply in a similar way for an inner wall element 24, even if such an inner wall element is not contained in a corresponding representation in the present application. Inner wall elements 24 also have an opening which is similar to opening 44 and into which a radially lower end of strut lining element 38 may be accommodated.

With reference to FIG. 2, it is also pointed out that not all outer wall elements 22, which are adjacent to one another in the circumferential direction, have or must have an opening 44, since there are generally fewer support elements 16 than outer wall elements 22 and inner wall elements 24. This is also demonstrated, in particular, by the fact that there is one outer wall element 22' in which an opening 44 is not provided.

Outer wall elements 22, inner wall elements 24, and strut lining elements 38 are partially or entirely manufactured from fiber composite materials (CMC). As has already been mentioned at the outset, such CMC components, due to their unfavorable failure characteristics, have a lower usable strength as compared to conventional metal components which have been used up to now for turbine intermediate casings. Therefore, a greater number of outer wall elements 22 made of CMC are required for the design of flow channel 20, so that each individual outer wall element and the outer wall as a whole is able to withstand the thermal-mechanical loads. This also applies in a similar way for inner wall elements 24 and the inner wall of flow channel 20 formed therefrom.

Figure 3:
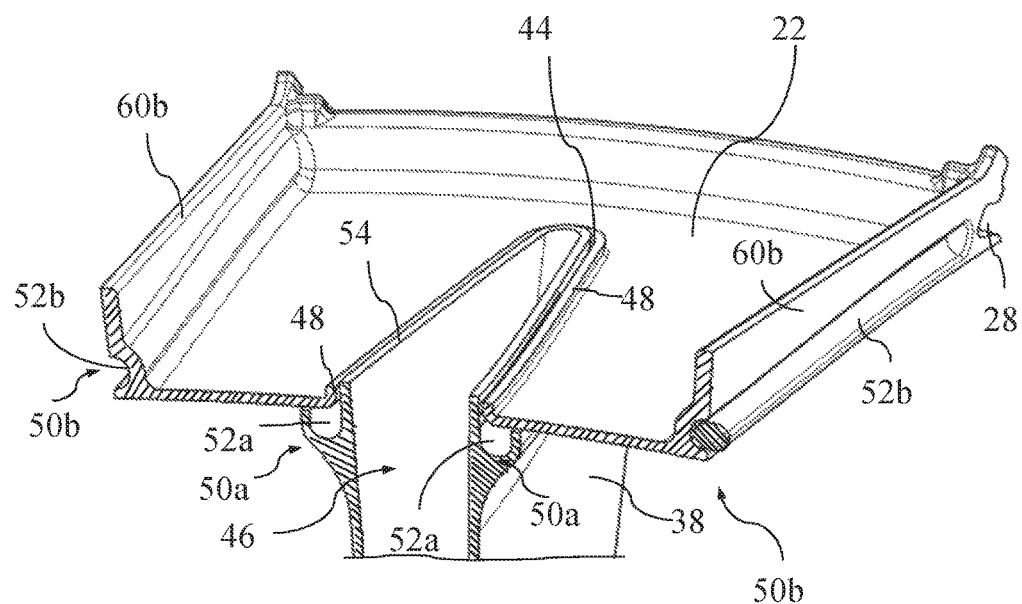
FIG. 3 shows a partially cut, schematic perspective representation of the outer wall element and the strut lining element.
Figure 7:
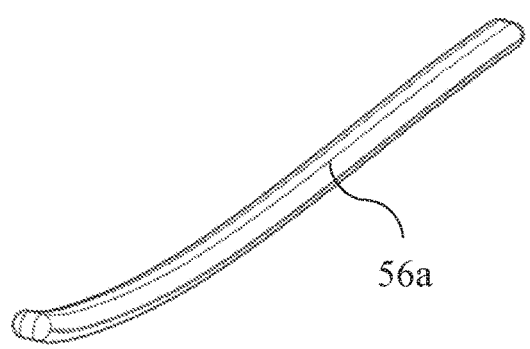
FIG. 7 shows a schematic sealing strip.

FIG. 3 shows a partially cut, schematic perspective representation of outer wall element 22 and strut lining element 38 accommodated therein, approximately along an intersection line in FIG. 2. Strut lining element 38 is accommodated in opening 44 of outer wall element 22. Opening 44 may be preferably delimited by a bead pointing in the radial direction or by flange-like section 48. Strut lining element 38 and outer wall element 22 are supported and sealed with respect to one another via a lining sealing system 50a. Lining sealing system 50a includes a recess 52a formed on strut lining element 38. Recess 52a preferably has a U-shaped or semicircular or curved cross section. In the case of strut lining element 38, recess 52a is situated continuously around a wall 54 delimiting accommodating space 46. A sealing strip 56, which is schematically represented, by way of example, in FIG. 7, may be placed into recess 52a in order to seal the transition between strut lining element 38 and outer wall element 22. Such a sealing strip is preferably designed as a braided hose having a yielding or deformable filling. The filling may be formed from ceramic fibers oriented in the longitudinal direction of sealing strip 56. Alternatively, the filling may also contain omnidirectional, shorter ceramic fibers or a type of ceramic grains or ceramic granulate. The braided hose may also be manufactured from a ceramic fabric or a metallic fabric.

Sealing system 50a between strut lining element 38 and outer wall element 22, which is described with reference to FIG. 3, may be designed in a similar way between strut lining element 38 and inner wall element 24. If FIG. 3, as shown, is rotated by 180° in the plane of the drawing, so that FIG. 3 is upside down, it could also be considered to be a schematic representation of the arrangement of strut lining element 38 on an inner wall element 24.

Figure 4:
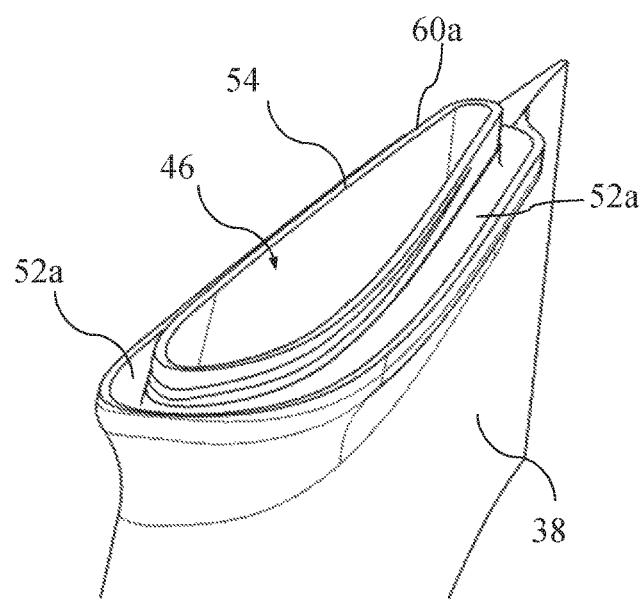
FIG. 4 shows the radially upper area of strut lining element in a simplified perspective representation.

FIG. 4 shows the radially upper area of strut lining element 38 in a simplified perspective representation. Recess 52a and wall 54 delimiting accommodating space 46 are apparent. FIG. 4 also shows the preferably aerodynamic design of strut lining element 38, so that hot exhaust gas in the flow channel may flow around the strut lining element with preferably little resistance.

Figure 5:
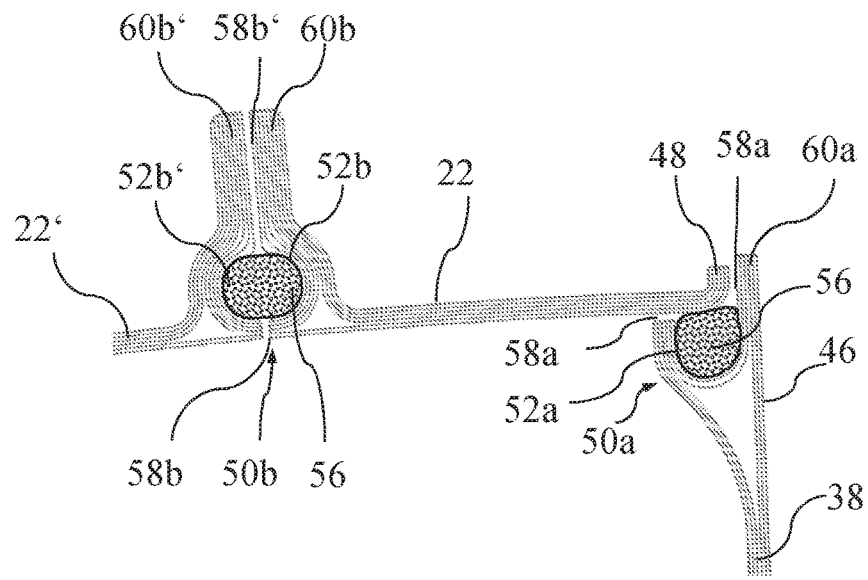
FIG. 5 shows a simplified and schematic sectional representation approximately corresponding to the intersection line V-V of FIG. 2.

FIG. 5 shows a simplified and schematic sectional representation approximately corresponding to the intersection line V-V of FIG. 2. Apparent in FIG. 5 is an outer wall sealing system 50b which is provided between adjacent outer wall elements 22 and 22'. Such an outer wall sealing system 50b is also partially apparent in FIG. 3 and is labeled using the same reference numerals. Sealing system 50b includes a recess 52b and 52b' formed in outer wall element 22 and in outer wall element 22', respectively, this recess 52b, 52b' also having an essentially U-shaped or semicircular or curved cross section. A sealing strip 56 (FIG. 7) is accommodated in recess 52b, 52b', so that the two outer wall elements 22, 22' are supported and sealed with respect to one another with the aid of sealing system 50b. Also apparent in FIG. 5, on the right side, is lining sealing system 50a including recess 52a, which is provided in strut lining element 38, and sealing strip 56 accommodated therein. Outer wall element 22 rests on sealing strip 56 of lining sealing system 50a via edge area 48 of opening 44. It is further apparent from FIG. 5 that expansion gaps 58a and 58b are formed between adjoining outer wall elements 22, 22' and between outer wall element 22 and strut lining element 38.

Figure 6:
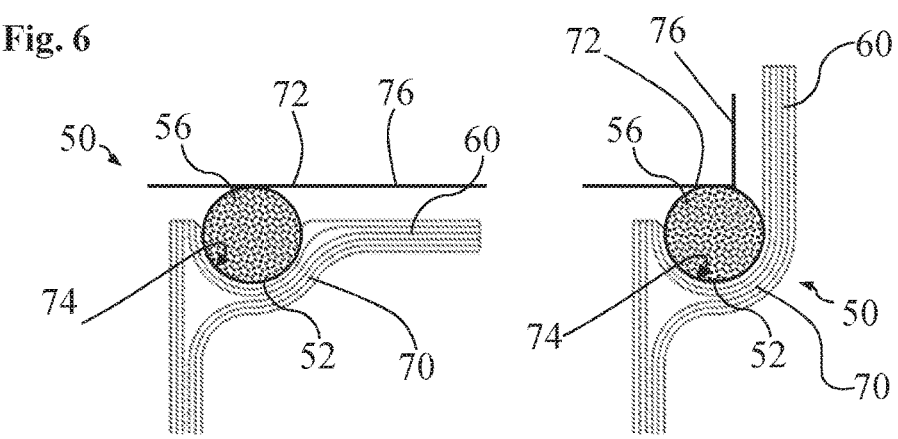
FIG. 6 shows, by way of example, two sealing systems in a generalized form of the representation.

FIG. 6 shows, by way of example, two sealing systems 50 in a generalized form of the representation. Each sealing system 50 includes a first component 70 and a second component 72. Formed in particular first component 70 is a recess 52 including an inner section 74. A sealing strip 56 is accommodated in recess 52. Sealing strip 56 rests on the curved or bent contour of inner section 74 in this case. In FIG. 6, each of the recesses 52 has a flange section 60 on its right edge, which may be used to withstand forces from adjacent components, which act in the area of sealing system 50. In this way, flange section 60 of first component 70 may support a particular flange-like section 76 of second component 72.

The embodiment having an angled flange section 60 according to the left side of FIG. 6 is also implemented, for example, for flange sections 60b and 60b' of outer wall elements 22 and 22', respectively, of FIG. 5. In this example, the two outer wall elements 22 and 22' form the first and the second components, respectively, of a sealing system. A combination corresponding to the right side of FIG. 6 including a flange section 60 which is parallel to the edge of recess 52 and raises or extends the edge is implemented as flange section 60a of strut lining element 38, for example (FIG. 5). In this case, for example, strut lining element 38 forms the first component, and outer wall element 22 forms the second component of a sealing system including sealing strip 56.

Flange section 60*a* of strut lining element 38 is situated circumferentially around accommodating space 46, as is apparent from FIG. 4. Therefore, flange section 60*a* may be accommodated in opening 44 of outer wall element 22 in essentially the radial direction with play (expansion gap 58*a*). Flange section 60*a* may rest against the bead or flange section 48 of opening 44 during mechanical-thermal loading and an associated expansion of the interconnected components, so that strut lining element 38 and outer wall element 22 are resting against each other in this area and, overall, a stabilizing effect is achieved.

Flange sections 60*b* and 60*b'* sandwich expansion gaps 58*b* between them and may rest against each other during mechanical-thermal loading and upon expansion of outer wall elements 22 and 22', in order to withstand the forces which occur. Flange sections 60*b* and 60*b'* also function as reinforcement ribs which provide outer wall element 22 and 22', respectively, with greater stability.

As already mentioned above with respect to FIG. 3, FIG. 5 may also be rotated by 180° in the plane of the drawing, so that it is upside down, whereby a simplified illustration of the situation for inner wall elements may be obtained.

As is apparent from FIGS. 5 and 6, the preferred positions of the fiber fabric of ceramic fibers of the CMC components is represented, by the thin black lines, for outer wall elements 22, 22' and strut lining element 38 and first component 70 and second component 72. It is pointed out, in particular, that all recesses 52 (FIG. 6), 52*a* and 52*b* (FIG. 5) may be formed by bent ceramic fibers. Since ceramic fibers may not be bent so as to have arbitrary small radii, all recesses have a relatively large radius of curvature. Sealing strip 56 accommodated in the recesses has a radius or diameter which approximately corresponds to the radius of the recess, so that sealing strip 56 is accommodated in recess 52 with a close fit. Since sealing strip 56 is deformable in the transverse direction, manufacturing tolerances which are present, or necessary play, between outer wall elements 22, or between inner wall elements 24 or between the strut lining elements and the wall elements, may nevertheless be sufficiently and reliably sealed (see, for example, sealing strip 56 of sealing system 50*a*, which is shown deformed in FIG. 5). The shape of the inserted sealing strips adapts to the thermos-mechanical conditions when the different components expand during operation of the gas turbine.

Due to the use of CMC for the first and the second components 70, 72, respectively, the outer wall elements 22, the inner wall elements 24, and the strut lining elements 38, weight may be reduced as compared to a conventional metal design, and higher gas temperatures may be utilized. Since a greater number of individual outer wall elements and inner wall elements must be situated next to one another and sealed with respect to one another in order to form the entire outer wall and the entire inner wall, the deformable sealing strips having a relatively large diameter may be advantageously utilized.

Due to the fiber orientations or fabric layers indicated according to FIGS. 5 and 6, in particular in the area of the recesses, such recesses or sealing shells may be manufactured, without mechanical reworking, in one step using the entire CMC component (outer wall element 22, inner wall element 24, strut lining element 38). As a result, the problems associated with the inability to use electrical or electrochemical material-removal processes with CMC components may be avoided.

Overall, a novel concept of a sealing system results, which is made of a first and a second component and has a sealing strip accommodated therebetween. This is represented, in particular and by way of example, by the design of lining elements including outer wall elements, inner wall elements, and strut lining elements made of ceramic fiber composite materials in interaction with a modified fastening of outer wall elements and inner wall elements on the supporting structures of the turbine intermediate casing. The selected design for the turbine intermediate casing, in which the outer wall elements are fastened on the outer casing, the inner wall elements are fastened on the annular holding structure, and the strut lining elements are floatingly accommodated between the particular outer wall elements and the particular inner wall elements, makes it possible to avoid the transfer of loads from adjacent components via the CMC components (outer wall elements, inner wall elements, strut lining elements). This results, overall, in a lower mechanical load on these CMC components of the turbine intermediate casing.

Even though the sealing system 50 (FIG. 6) has been described in greater detail in particular with reference to a turbine intermediate casing, this does not pose a limitation on the use and the utilization of the sealing system. Rather, such a sealing system may also be utilized in other components of a turbine, in particular an aircraft gas turbine, an aircraft, a vehicle, or any other type of machine or device. The presented sealing system may also be utilized anywhere, in particular, where metallic components are to be replaced by multiple CMC components, and the CMC components must be sealed with respect to one another. Furthermore, the sealing system presented here also allows for a floating support of components.

LIST OF REFERENCE NUMERALS 10 turbine intermediate casing
12 shaft system
14 outer casing
16 support element
18 holding structure
20 flow channel
22 outer wall element
24 inner wall element
26 connection system
28 hook-like projection
30 counterpart
32 connection system
34 hook-like projection
36 counterpart
38 strut lining element
40 stop
42 axially front side
44 opening
46 accommodating space
48 flange-like section
50*a* lining sealing system
50*b* outer wall sealing system
52*a/b* recess
54 wall
56 sealing strip
58*a/b* expansion gap
60*a/b* flange section
70 first component
72 second component
74 inner section
76 flange-like section

What is claimed is:

1. A sealing system comprising:
a first component at least partially manufactured from ceramic fiber composite materials;
a second component at least partially manufactured from ceramic fiber composite materials;
a sealing element accommodated between the first component and the second component, the sealing element being designed as a sealing strip,
at least one recess accommodating the sealing element being formed on the first component or on the second component, the recess having a cross-sectional profile including an inner section concave toward the sealing element, a radius of curvature of the inner section being selected so as to be formable with continuous, curved fibers of the ceramic fiber composite material.

2. The sealing system as recited in claim 1 wherein the fibers are oriented to lie in parallel to a cross-sectional plane of the cross-sectional profile.

3. The sealing system as recited in claim 1 wherein the sealing strip includes a braided hose having an elastic or deformable filling.

4. The sealing system as recited in claim 3 wherein the filling is formed from ceramic fibers extending in a longitudinal direction of the sealing strip.

5. The sealing system as recited in claim 1 further comprising an adjoining flange section is formed in the area of the recess, on at least one edge of the recess.

6. The sealing system as recited in claim 5 wherein the first and the second components are supported against one another with the aid of one flange section or with the aid of multiple flange sections.

7. The sealing system as recited in claim 1 wherein an expansion gap is formed between the first component and the second component, the first and second components being situated adjacent to one another.

8. The sealing system as recited in claim 1 wherein the at least one recess includes a first recess in the first component and a second recess in the second component, the first and second recesses being situated opposite one another in such a way that the sealing strip is surrounded by the first and second recesses and is accommodated between the first and second recesses.

9. The sealing system as recited in claim 1 wherein the sealing strip is a braided hose made of metallic or ceramic materials.

10. The sealing system as recited in claim 1 wherein the sealing element has a sealing element outer radius, a radius of curvature of the inner section being the same as the sealing element outer radius.

11. A turbine intermediate casing for a gas turbine, the intermediate turbine casing comprising:
a plurality of outer wall elements situated in succession in a circumferential direction;
a plurality of inner wall elements situated in succession in the circumferential direction, the outer wall elements and the inner wall elements delimiting a flow channel for exhaust gas by the inner sides facing one another;
a plurality of strut lining elements situated in the radial direction between a respective outer wall element of the outer wall elements and a respective inner wall element of the inner wall elements;
an outer casing surrounding the outer wall elements and the inner wall elements; and
an annular holding structure surrounding a bearing area of a shaft of the gas turbine;
the strut lining elements being designed in such a way to have an accommodating space for accommodating support elements extending from the annular holding structure in a radial direction to the outer casing, through the flow channel, so that exhaust gas flowing through the flow channel is directed around the support elements by the strut lining elements,
a sealing system as recited in claim 1, one particular outer wall element of the outer wall elements or one particular inner wall element of the inner wall elements or one particular strut lining element of the strut lining elements forming the first or the second component of the sealing system.

12. The turbine intermediate casing as recited in claim 11 wherein the shaft of the gas turbine is a high-pressure turbine shaft.

13. A gas turbine comprising the turbine intermediate casing as recited in claim 11.

14. An aircraft gas turbine comprising the gas turbine as recited in claim 13.

* * * * *